Patented Mar. 4, 1941

2,234,018

UNITED STATES PATENT OFFICE 2,234,018

SULPHUR COLOR DERIVED FROM SUBSTITUTED ARYL CARBAMIC ESTERS

Newell M. Bigelow, Wilmington, Del., assignor to E. I. du Pont de Nemours & Company, Wilmington, Del., a corporation of Delaware No Drawing. Application July 3, 1940, Serial No. 343,776

15 Claims. (Cl. 260—132)

This invention relates to sulphur dyes, and particularly to the sulphur dyes producible by baking mixtures of aryl carbamic acid esters and aromatic diamines with sulphur. These dyes may be applied to vegetable fibres from an alkaline sulphide bath; they produce novel shades, which possess fastness properties similar to and in some instances superior to those of the sulphur dyes of approximately similar shade now commercially available.

It is well known to those experienced in the art that sulphur colors may be prepared by baking aromatic amines or polyamines, either pure or in mixtures, with sulphur. It is also well known that in many instances sulphur colors with improved fastness properties may be prepared if the amino group or groups in the intermediates are partially or completely acylated or alkylated. For example, sulphur dyes with relatively good fastness properties may be manufactured by baking with sulphur such intermediates as 2-nitro-4-methyl-acetanilide, p-amino-acetanilide or di-formyl-m-toluylene diamine. It was not realized, however, that the ester of aryl carbamic acids could be thionated similarly, and that the thionation products of these intermediates would prove to be novel in shade and to possess exceptional tinctorial and other properties.

It is among the objects of this invention to provide new sulphur colors in novel shades, which possess fastness properties similar to and in some instances superior to those shown by the commercially available sulphur colors of approximately similar shade. Other objects of the invention will be apparent from the following description.

The objects of the invention are accomplished in general by the thionation of substituted aryl carbamic acid esters of the type represented in the general formula

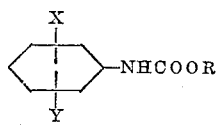

in which R represents an alkyl group containing from one to four carbon atoms; X represents hydrogen, or an alkyl or alkoxy group containing from one to four carbon atoms, or a free amino group, or an alkacylamino group containing 1 to 6 carbons in the alkyl group, or a second alkyl-carbamido group similar to the first; and Y represents hydrogen, or an alkyl or alkoxy group containing from one to four carbon atoms.

The aryl carbamic acid esters may be prepared in a number of ways. A desirable method consists in reacting an aqueous suspension of an aromatic amine or diamine with somewhat more than the theoretically necessary quantity of an alkyl chloro-carbonate in the presence of an acid-binding agent or buffer. The reaction may be represented by the equation:

$$ArNH_2 + Cl\text{—}COOR = ArNHCOOR + HCl$$

The acid formed in the reaction is removed by combining with the acid-binding agent. When simpler aromatic amines are used, the reaction runs rapidly and almost quantitatively at room temperatures or slightly elevated temperatures; and the product may be filtered out of the reaction mixture in crystalline state, already sufficiently pure for use in the thionation.

Aryl carbamic acid esters may also be prepared by the reaction of a hot mixture of an aromatic amine and an alkyl halocarbonate in an inert organic solvent. This reaction runs slowly. The hydrochloric acid formed by the reaction may be driven out of the reaction mixture by prolonged boiling, or may be neutralized by adding an acid binding agent. Sometimes two molecules of amine are used for each molecule of the alkyl chlorocarbonate; in this case the second molecule of the amine acts as the acid binding agent. When the reaction is ended, the hot reaction mixture is filtered, and the product is isolated from the filtrate by crystallization.

A third general method for the preparation of aryl carbamic acid esters is by the reaction of an aryl isocyanate with a hot anhydrous alcohol. This reaction can be represented by the equation:

$$ArNCO + HOR = ArNH\text{—}COOR$$

The product is recovered from the reaction mixture by crystallization.

The thionation of the described intermediates is carried out in the usual manner in the presence of an adjuvant by any methods known to those skilled in the art. Essentially the process consists in heating, as by baking the intermediate or intermediates with sulphur in the presence of an adjuvant at a suitable temperature, with or without agitation, until thionation has taken place. The equipment in which the thionation is carried out is desirably constructed of any material which is substantially inert to the reagents used in the process, such as a material which will not be attacked by the intermediates, the reaction product or the gaseous by-products of the reaction so as to contaminate the product with undesirable impurities. Cast iron or stainless steel are particularly suitable. The organic intermediates may be mixed with the sulphur at the start of the reaction, or the sulphur may be melted alone and the intermediates added to the molten mass at a higher temperature. Agitation is necessary at the start of the reaction, and is advisable throughout the reaction. However, agitation throughout the thionation is not always possible because of the viscous character of the reaction mixture. The optimum temperature for thionation varies according to the intermediate and the shade of the product desired; a considerable variation in the shade of the product may be obtained by control of the reaction temperature. The thionation period also varies with the susceptibility of the intermediates to thionation and with the temperature at which the reaction is run. The reaction period in most cases is from 8 to 24 hours. In some cases, a decrease in the volume of the gases escaping from the reaction vessel indicates that the reaction is completed. In other cases it is necessary to remove samples from time to time and to submit them to dyeing tests to determine their shade and strength. When a satisfactory shade and strength are obtained, the heating is stopped.

There are several methods available for the isolation of the product from the thionation mass. A commonly used method is that of digesting the ground crude product with enough aqueous sodium hydroxide to convert all of the free sulphur to sodium sulphide, according to the equation:

$$6NaOH + 4S = 2Na_2S + Na_2S_2O_3 + 3H_2O$$

The dye dissolves in its leuco form in this aqueous medium. When these reactions are complete, insoluble by-products are filtered off, and the dye is recovered from the filtrate after it is precipitated therein by cautious acidification. Another method by which the product can be purified is by digesting the ground crude product with sodium sulphite. Excess sulphur reacts with the sulphite according to the equation $$Na_2SO_3 + S = Na_2S_2O_3$$

while the dye remains undissolved, and may be filtered off when the solution of the excess sulphur is complete. Still another method of isolation is that of aeration, whereby a suspension of the crude product is made in an alkaline aqueous solution. The mixture is heated and a stream of air is blown through it. Under these conditions the excess sulphur is converted to sodium polysulphide. The sodium polysulphide is then oxidized by the air to sodium thiosulphate. At the same time the dye is converted to a partially oxidized form which is insoluble in the medium. After all of the sulphur has been converted to thiosulphate the dye is filtered from the solution.

The invention will be more fully set forth in the following more detailed description which includes examples that are given as illustrative embodiments of the invention and not as limitations thereof. Parts are expressed in parts by weight unless otherwise noted.

*Example I*

One part of carbanilic acid methyl ester $$(C_6H_5-NH-COO-CH_3)$$

0.55 part of m-toluylene diamine, 0.32 part of benzidine and 3.5 parts of sulphur were mixed at room temperature in a stainless steel thionating vessel which was equipped with a heavy agitator, a thermometer well and a vent for the escape of gaseous reaction products. The mixture was heated cautiously with agitation to a final temperature of 240° C., and held at this temperature for 12 hours. Agitation was continued until the mixture became too viscous to stir. A vigorous reaction took place, with much frothing and evolution of gases. When the reaction was completed, the thionation mass was cooled and ground coarsely. The ground mass was suspended in 15 parts of water, 2.5 parts of sodium hydroxide were added, and the mixture was agitated at 90°–95° C. for 2 hours. At the end of this time the suspension was filtered. The filtrate was chilled to 0° and acidified cautiously with hydrochloric acid. The amorphous precipitate of the leuco product was filtered off, washed with water and dried at 60° C.

The dye was readily soluble in hot dilute sodium sulphide solution. Cotton immersed in this bath and exposed to the air was colored a strong reddish yellow. The dyeing was superior to other sulphur colors of approximately similar shade in its fastness to laundering, and equal in other respects.

*Example II*

A cast iron thionating kettle was charged with 10.0 parts of sulfur and heated until the sulphur had melted and become fluid. Then 1.0 part of p-amido-carbanilic acid ethyl ester $$(H_2N-C_6H_4-NH-COO-C_2H_5)$$

and 2.4 parts of meta toluylene diamine were added. The thionation mass was heated to approximately 240° C. and held at this temperature for 6 hours. Then the mass was cooled and ground coarsely. The ground mass was digested in a solution of 20 parts of sodium sulphite in 80 parts of water at 90° for 3 hours. Then it was filtered; the insoluble material, which consisted of the leuco form of the dye, was washed on the filter and dried at 70° C.

The product was soluble in warm dilute sodium sulphide solution. Cotton goods were dyed a reddish orange by immersing them in this bath and then exposing them to mild oxidizing agents. The shade of this dyeing was different from any sulphur color of which I am aware. The fastness properties of this dye were superior to those of most sulphur colors.

*Example III*

A mixture of one part of 1,4-phenylene-dicarbamic acid dimethyl ester $$(CH_3-OOC-NH-C_6H_4-NH-COO-CH_3)$$

0.7 part of m-toluylene diamine and 2.8 parts of sulphur were heated slowly to a final temperature of 200° C. in a stainless steel thionating kettle. After 15 hours of heating at this temperature the mixture was cooled and ground. The crude product was suspended in 30 parts of water and heated to a temperature of 65° C. Air was forced through the suspension, and small amounts of sodium hydroxide were added at intervals, in quantity sufficient to maintain the suspension slightly alkaline to Clayton Yellow paper. When all of the excess sulphur had been converted to thiosulphate and all of the dye had been converted to an insoluble oxidized form, the suspension was filtered. The filter cake, which consisted of the dye in its oxidized form, was washed with water and dried. The product was a yellow-brown powder, insoluble in water but soluble in warm dilute sodium sulphide solution. Cotton goods, immersed in an aqueous sodium sulphide solution and then exposed to atmospheric oxygen, were colored a bright lemon yellow. The fastness properties of the dyeing were superior to dyeing made with most sulphur colors.

*Example IV*

One part of 3-methyl-carbanilic acid propyl ester ($CH_3$—$C_6H_4$—$NH$—$COO$—$C_3H_7$), 0.5 part of m-toluylene diamine and 4.0 parts of sulphur were heated in a cast iron thionating kettle to a temperature of 130° C. At this temperature 0.5 part of benzidine was added; the temperature of the thionation mass was raised to 240° C. and held at this point for 12 hours. At the end of this time the mixture was cooled, ground and treated with an excess of sodium hydroxide, as described in Example I. The dye produced in this manner dyed cotton goods a deep tan from a sulphide bath. The fastness of the dyeing to laundering was decidedly superior to those made with other sulphur dyes of similar shade. Other fastness properties were closely similar but slightly superior.

*Example V*

One part of 2-acetylamino-4-methyl-carbanilic acid ethyl ester

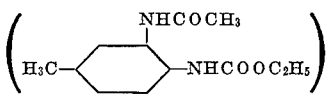

1.0 part of m-toluylene diamine and 3.0 parts of sulphur were heated to a temperature of 220° C. in suitable equipment and held at this temperature for 8 hours. At the end of this period the mass was worked up by digestion with sodium sulphite, as described in Example 2. The dye thus obtained dyed cotton a yellowish tan from a sulphide bath. The fastness properties of the dyeing were similar to those of other sulphur colors of approximately like shade.

*Example VI*

One part of 4-methoxy-carbanilic acid butyl ester ($CH_3O$—$C_6H_4$—$NHCOOC_4H_9$), 2.0 parts of benzidine, 1.0 part of m-toluylene diamine and 4.0 parts of sulphur were heated slowly to 230° C. in suitable thionating equipment, and held at this temperature for 15 hours. At the end of this time the thionation mass was cooled, ground and purified by extraction with sodium hydroxide, as explained in Example I. The sulphur dye thus obtained dyed vegetable fibres a brown, with fastness properties similar to those of other sulphur colors of similar shade.

As illustrations of the many other compounds of the above described class which can be thionated and prepared by the methods described and which produce sulphur dyes having properties similar to those specifically described are:

2-methyl-5-ethyl-carbanilic acid methyl ester,
4-isopropyl-carbanilic acid ethyl ester,
3-propyl-5-propoxy-carbanilic acid propyl ester,
3-ethoxy-4-butoxy-carbanilic acid methyl ester and
2-methyl-4-propoxy-carbanilic acid ethyl ester.

Thionation temperatures can be quite widely varied from about 170° C. below which the velocity of the reaction becomes slow to about 270° C. above which harmful charring and objectionable thermal decomposition may occur. Within the workable temperature range the velocity of the reaction is affected by higher or lower temperatures and slight modifications in shade may be brought about by using different thionation temperatures. Variations in yield are also affected by the thionation temperature. The optimum temperature for any given thionation can be readily determined by experiment within the stated temperature range, having due regard to the particular variation of shade desired.

Any adjuvant of which many are known to those skilled in the art, can be used. Meta toluylene diamine or benzidine or mixtures of the two are the most desirable adjuvants as they give better results with the intermediates used to make the new dyes of this invention. The preferred embodiments of the invention are the dyes obtained from carbanilic acid alkyl esters and those from 4-amino-carbanilic acid alkyl esters, and of these carbanilic acid methyl ester and 4-amino-carbanilic acid ethyl ester are preferred. They are most desirable because of their novel shades and their generally excellent properties.

The essential nature of the products is not materially altered by the type of thionator employed, provided the apparatus is constructed of material which does not contaminate the products. Thionating kettles of the usual type, rotary bakers or shallow trays in which the contents are not agitated, can be used. Any method of isolating the dye from the thionation mass can be used.

The products can be suitably preserved for use in the dry pure form or the pure forms of the products can be made into standardized mixtures containing salt, soda ash, urea, sodium sulphide or other reagents in the manner in which other sulphur dyes are sometimes treated. Such compositions may be made in a dry form or in the form of an aqueous paste.

From the foregoing disclosure it will be recognized that the invention is susceptible of modification without departing from the spirit and scope thereof and it is to be understood that the invention is not restricted to the specific illustrations thereof herein set forth.

I claim:

1. A sulphur dye obtained by thionating an aryl carbamic acid ester which is represented by the formula

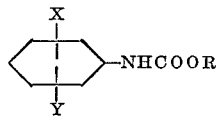

in which R is an alkyl group having 1 to 4 carbons; Y is one of a group consisting of hydrogen and alkyl having 1 to 4 carbons; and X is one of a group consisting of hydrogen, alkyl having 1 to 4 carbons, the corresponding alkoxy groups, amino, alkacylamino containing 1 to 6 carbons in the alkyl group and the group —NHCOOR.

2. A sulphur dye obtained by thionating a carbanilic acid alkyl ester in the presence of an adjuvant, said alkyl group having 1 to 4 carbons.

3. A sulphur dye obtained by thionating a 4-amino-carbanilic acid alkyl ester in the presence of an adjuvant, said alkyl group having 1 to 4 carbons.

4. A sulphur dye obtained by thionating carbanilic acid methyl ester in the presence of an adjuvant.

5. A sulphur dye obtained by thionating 4-amino-carbanilic acid ethyl ester in the presence of an adjuvant.

6. The sulphur dye in accordance with claim 4 where the adjuvant is at least one of a group consisting of bendidine and meta toluylene diamine.

7. The sulphur dye in accordance with claim 5 where the adjuvant is at least one of a group consisting of meta toluylene diamine and benzidine.

8. The process of making a sulphur dye which comprises heating to thionation temperatures in the presence of sulphur and an adjuvant, an aryl carbamic acid ester which is represented by the formula

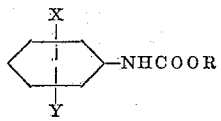

in which R is an alkyl group having 1 to 4 carbons; Y is one of a group consisting of hydrogen and alkyl having 1 to 4 carbons; and X is one of a group consisting of hydrogen, alkyl having 1 to 4 carbons, the corresponding alkoxy groups, amino, alkacylamino containing 1 to 6 carbons in the alkyl group and the group —NHCOOR, until a thionation product is formed; and then separating the thionation product.

9. The process in accordance with claim 8 in which the maximum thionation temperature is about 170° C. to about 240° C.

10. The process in accordance with claim 8 in which the intermediate to be thionated is an alkyl ester of carbanilic acid wherein alkyl has 1 to 4 carbons.

11. The process in accordance with claim 8 in which the intermediate to be thionated is an alkyl ester of 4-amino-carbanilic acid wherein alkyl has 1 to 4 carbons.

12. The process in accordance with claim 8 in which the intermediate to be thionated is carbanilic acid methyl ester.

13. The process in accordance with claim 8 in which the intermediate to be thionated is 4-amino-carbanilic acid ethyl ester.

14. The process of making a sulphur dye which comprises heating carbanilic acid methyl ester in a thionating medium to a final thionating temperature not exceeding about 240° C. until said ester is thionated, said thionating medium comprising meta toluylene diamine and benzidine as an adjuvant; and then separating the thionated product.

15. The process of making a sulphur dye which comprises heating 4-amino-carbanilic acid ethyl ester in a thionating medium to a final thionating temperature not exceeding about 240° C. until said ester is thionated, said thionating medium comprising meta toluylene diamine as an adjuvant; and then separating the thionated product.

NEWELL M. BIGELOW.